United States Patent [19]
Tsuchida et al.

[11] Patent Number: 5,777,826
[45] Date of Patent: Jul. 7, 1998

[54] LOAD BEAM FOR SUPPORTING A TRANSDUCER HEAD IN A DISK DRIVE

[75] Inventors: Hiroyasu Tsuchida, Yokohama; Akihiko Aoyagi; Tatsuya Endo, both of Kanagawa-ken, all of Japan

[73] Assignee: International Business Machines Corporation, Armonk, N.Y.

[21] Appl. No.: 623,944

[22] Filed: Mar. 29, 1996

[30] Foreign Application Priority Data

Mar. 31, 1995 [JP] Japan ................... 7-075213

[51] Int. Cl.⁶ ........................................ G11B 5/48
[52] U.S. Cl. ................................................ 360/104
[58] Field of Search ........................... 360/104, 109

[56] References Cited

U.S. PATENT DOCUMENTS 5,543,985 8/1996 Donnelly et al. ................... 360/104
5,570,249 10/1996 Aoyagi et al. ...................... 360/104

*Primary Examiner*—Robert S. Tupper
*Assistant Examiner*—George J. Letscher
*Attorney, Agent, or Firm*—Shawn B. Dempster; David W. Lynch

[57] ABSTRACT

A load beam for a data storage device having a first end operatively configured for connecting to a head actuator arm and a second end operatively configured for supporting a signal transducer head is provided. The load beam has a flange with a bent portion. The bent portion is arranged by bending the standing portion of the flange in the middle thereof outwardly from the load beam. The bent portion is arranged so that it progressively becomes wider as it runs toward the end of the load beam. The flange is adapted to be nearly flush with a flat base surface at the end of the load beam so as not to have a standing portion and such that signal wires may be connected to a signal transducer head without being unduly bent.

9 Claims, 5 Drawing Sheets

1

LOAD BEAM FOR SUPPORTING A TRANSDUCER HEAD IN A DISK DRIVE

FIELD OF THE INVENTION

The present invention relates to a disk storage unit, and more particularly to an arrangement of a suspension load beam to one end of which a signal transducer head is attached.

BACKGROUND OF THE INVENTION

Magnetic disk units have recently been undergoing downsizing, especially thinning, and accordingly, various modifications have been made to the arrangement thereof. The modifications include those to a structure for installing, to an actuator, a suspension supporting a magnetic head and a structure for installing a magnetic head to a load beam.

As shown in FIG. 6, in a typical arrangement supporting a signal transducer head, a gimbal supporting arrangement, the head 10 is supported by a flexure 12, which is attached to a load beam 14. The load beam 14 is secured to an actuator arm, which is driven by a motor to place the signal transducer head 10 in a predetermined position on a disk 16 for signal reading or writing.

To provide the load beam 14 with a predetermined natural frequency and mechanical properties, such as stiffness, the side portions thereof, are bent through an angle of about 90° relative to a base flat surface 24, to form flanges 26 on both sides of the load beam. The flanges perform a function in providing the load beam with mechanical properties required.

Signal wires are connected to the signal transducer head 10 to transmit data writing or reading signals. Since these wires, placed along the load beam, are connected to the signal transducer head in a cramped area at one end of the load beam, the wire connecting operation can be difficult. In particular, portions of the flanges, formed on both sides at the end of the load beam, further restrict the cramped area and thus increase difficulties in separating a plurality of wires to be connected and connecting the wires to the signal transducer head connecting section.

A need exists for a mechanism which has a sufficient area to improve wiring workability during signal wire installation to a conventional load beam to provide a load beam configuration for disk units. In addition, it is desirable to provide a load beam configuration for disk units which facilitates a signal wire connecting operation without reducing load beam stiffness and without preventing a disk unit from being thinned.

The present invention provides a solution to these and other problems, and offers other advantages over the prior art.

SUMMARY OF THE INVENTION

To solve the problems described above, a load beam to which a disk unit signal transducer head of the present invention is attached has such a configuration that the flanges are opened outwardly proximate the end of the load beam, at which the signal transducer head is supported.

In accordance with one embodiment of the invention, the ends of the standing portions are bent, constituting the load beam flanges, outwardly in the vicinity of the end of the load beam, at which the signal transducer head is supported, to form bent portions so that the bent portions approach the flat base surface as the bent portions run toward the end of the load beam.

In accordance with another embodiment of the invention, the angle formed by the load beam flange and the flat base surface is larger proximate the end of the signal transducer head side of the load beam, than that on the head actuator arm side of the load beam.

In accordance with another embodiment of the invention, the flanges of the load beam are opened so that the flanges are nearly flush with the base flat surface in the vicinity of the end of the load beam, at which the signal transducer head is supported.

These and various other features as well as advantages which characterize the present invention will be apparent upon reading of the following detailed description and review of the associated drawings.

DETAILED DESCRIPTION

Figure 1:
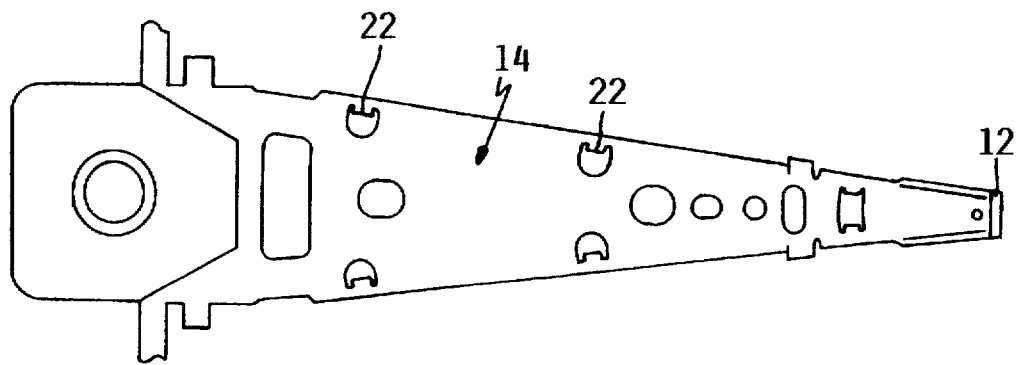
FIG. 1 is a top view of an embodiment of a load beam according to the present invention.
Figure 2:
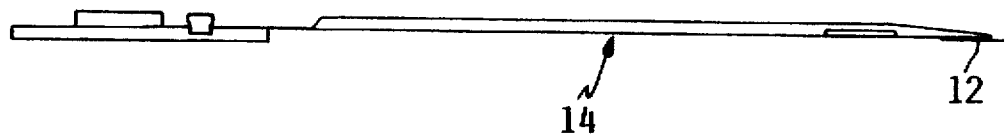
FIG. 2 is a side view of an embodiment of a load beam according to the present invention.

FIGS. 1 to 5 show embodiments of the present invention. Referring first to FIG. 1, there is shown a top view of a load beam according to the present invention, and FIG. 2 is a side view thereof. In a gimbal supporting arrangement, a signal transducer head (not shown) is supported by a flexure 12. The flexure 12 is attached to one end of a load beam 14, the other end of which is secured to an actuator arm not shown. The actuator arm, driven by a voice coil motor (VCM), places the signal transducer head in a predetermined position on a disk for signals to be read and written.

Wires for data writing and reading are connected to the signal transducer head. The wires, which are installed along the load beam 14, are led to the actuator arm side and connected to a given circuit. A signal wire holding mechanism 22, such as a clamp for signal wire fixing, is formed on the load beam 14 to prevent the wires from falling off the load beam 14.

Figure 3:
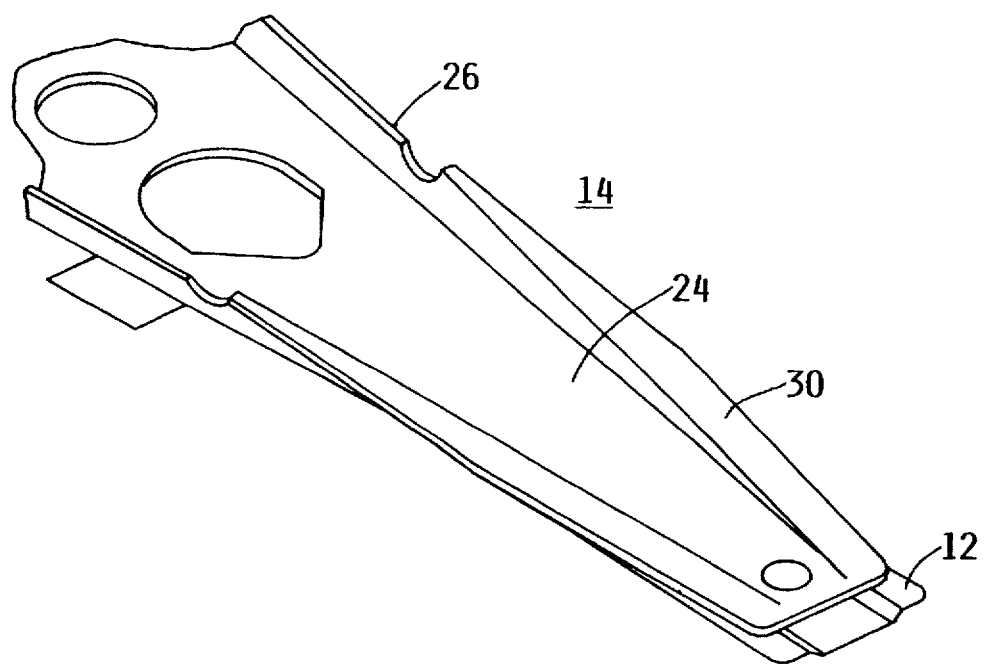
FIG. 3 shows an embodiment of the end of a load beam according to the present invention.
Figure 4:
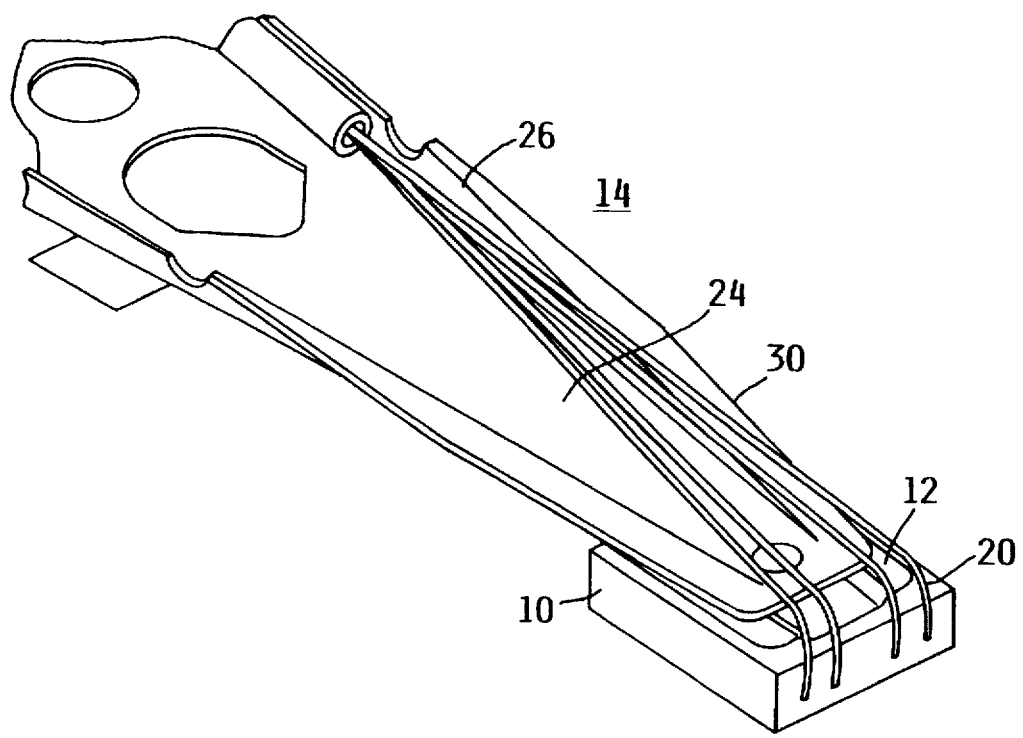
FIG. 4 shows an embodiment of a signal wire arrangement at the end of a load beam according to the present invention.
Figure 5:
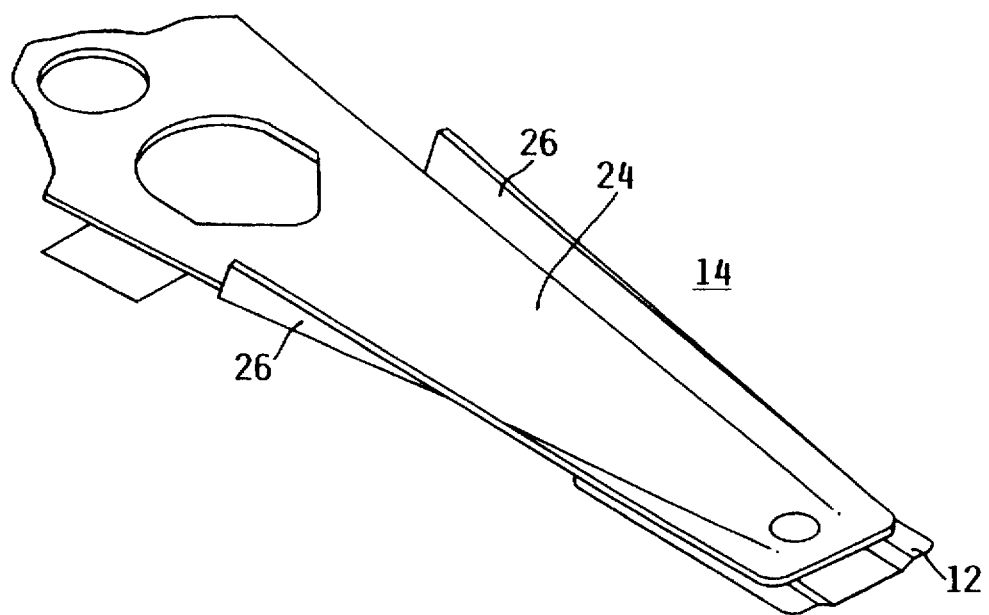
FIG. 5 shows an embodiment of the end of another load beam according to the present invention.
Figure 6A:
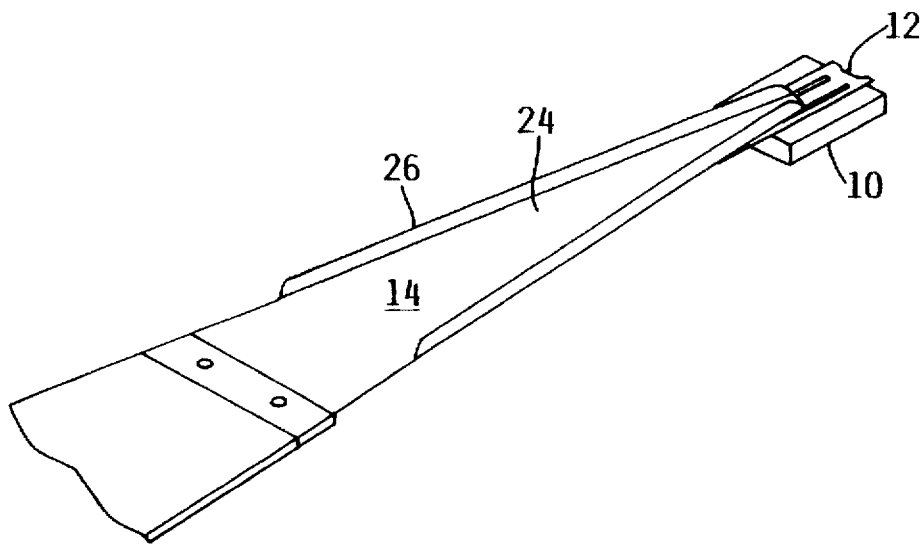
FIGS. 6a and 6b shows a structure of installation of a signal transducer head for a conventional load beam.
Figure 6B:
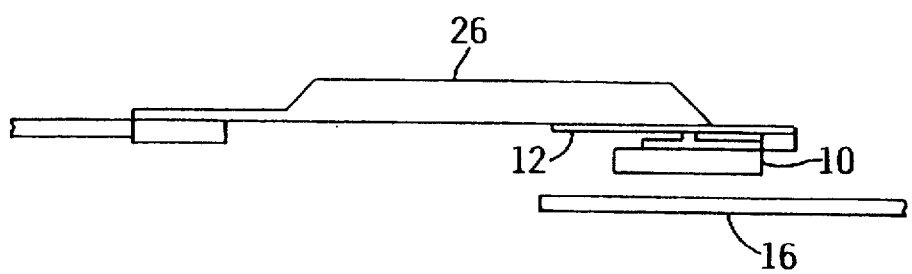

FIGS. 3 through 5 show enlarged views of the vicinity of a magnetic head support at the end of the load beam. FIG. 3 shows an arrangement in which the flexure 12 is secured to the load beam 14 having flanges 26. As shown in FIG. 3, the flanges 26 have bent portions 30. The bent portions 30 are arranged by bending standing portions, constituting the flanges 26, outwardly from the load beam in the middle of the flanges. The bent portions 30 are adapted to gradually approach a flat base surface as they run toward the end of the load beam, and the flanges 26 are adapted to be nearly flush with the base flat surface 24 of the load beam 14 at the end thereof, including no standing portions.

FIG. 4 shows the load beam 14, the flexure 12, the signal transducer head 10, and wires 20 connected to the signal transducer head 10. Four signal wires 20 are connected to the signal transducer head 10, two for reading and two for writing. As shown in FIG. 4, the signal wires 20 are connected in predetermined positions with the signal transducer 10 at predetermined intervals at the end of the load beam 14. The flanges 26 of the load beam 14 according to the present invention are opened at the end of the load beam, at which the signal transducer head is supported, so that the flanges are almost flush with the flat base surface 24. As a result, the signal wires 20, when connected to the signal transducer head 10, are not unduly bent. By removing the vertically standing flanges at the end of the load beam a wide area for connecting the signal wires 20 is formed which facilitates the signal wire connecting operation.

FIG. 5 shows another embodiment of the present invention, wherein the flexure 12 is secured to the load beam 14 as in FIG. 3. The flanges 26 in the embodiment are so arranged that the flange standing angle, or the angle formed by the flanges 26 of the load beam 14 and the base flat surface 24, is gradually increased in the vicinity of the end of the load beam, at which the signal transducer head is supported, as the flanges run from the head actuator arm side of the load beam 14. In the embodiment, the flanges 26 are also opened so that they are almost flush with the flat base surface 24 at the end of the load beam, to which the signal transducer head is attached, and thus allow the signal wires to be connected to the signal transducer head without being unduly bent.

The load beam as formed according to the present invention has the advantage of having the flanges of the load beam allow a broader area to be formed at the load beam end. Signal transducer heat is dissipated over this broader area which prevents damage to the transducer. In addition, signal wire deformation is minimized and wiring operations are facilitated by having this broader area on the load beam end.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed.

What is claimed is:

1. A load beam for a data storage device having a first end operatively configured for connecting to a head actuator arm and a second end operatively configured for supporting a signal transducer head, the load beam comprising:

(a) a flat base surface; and (b) flanges extending along longitudinal sides of the flat base surface for reinforcing the load beam, the flanges including standing portions intersecting the base at a first angle and bent portions that project at a second angle from the standing portion laterally outward with respect to the flat base surface, wherein the flat base surface and at least portions of the bent portions converge at the second end of the load beam, the bent portions being substantially flush with the flat base surface at the second end of the load beam.

2. The load beam of claim 1 wherein said standing portions are substantially orthogonally aligned with respect to the flat base surface, and wherein the bent portions are formed by outwardly bending ends of said standing portions.

3. The load beam of claim 2, wherein the bent portions are substantially orthagonal with respect to the standing portions.

4. The load beam of claim 1 wherein said flanges are arranged such that angles formed between said flanges and said flat base surface are larger proximate the second end of said load beam than proximate the first end of said load beam.

5. The load beam of claim 4, wherein the angles formed between the flanges and the flat base surface gradually increase from the first end of the load beam toward the second end of the load beam.

6. A system for storing data, comprising:

(a) a housing;

(b) a data storage disk having a mating surface;

(c) a spindle motor mounted to the housing and adapted for rotating the data storage disk;

(d) an actuator movably mounted to the housing;

(e) a transducer; and (f) a load beam having a first end operatively coupled to the actuator and a second end supporting the transducer, the load beam including a flat base surface and flanges extending along longitudinal sides of the flat base surface for reinforcing the load beam, the flanges including standing portions intersecting the base at a first angle and bent portions that project at a second angle from the standing portion laterally outward with respect to the flat base surface, wherein the flat base surface and at least portions of the bent portions converge at the second end of the load beam, the bent portions being substantially flush with the flat base surface at the second end of the load beam.

7. The system for storing data of claim 6 wherein the standing portions are orthogonally aligned with respect to the flat base surface, and wherein the bent portions are formed by outwardly bending ends of said standing portions.

8. The system for storing data of claim 6 wherein the load beam flanges are arranged such that angles formed between said flanges and said flat base surface are larger proximate the second end of said load beam than proximate the first end of said load beam.

9. A load beam for a data storage device having a first end operatively configured for connecting to a head actuator arm and a second end operatively configured for supporting a signal transducer head, the load beam comprising:

(a) a flat base surface; and (b) flanges extending along longitudinal sides of the flat base surface for reinforcing the load beam, the flanges including standing and bent portions forming angles with respect to the flat base surface, wherein the angles formed between the standing and bent portions and the flat base surface gradually increase from the first end of the load beam toward the second end of the load beam such that the bent portions of the flanges project laterally outward from and are substantially flush with the flat base surface of the load beam in the vicinity of the second end of the load beam.

* * * * *